US012621111B2

(12) United States Patent
Zhu

(10) Patent No.: US 12,621,111 B2
(45) Date of Patent: May 5, 2026

(54) METHODS FOR DETERMINING EFFECTIVE TIME, AND COMMUNICATION DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 560 days.

(21) Appl. No.: 18/027,793

(22) PCT Filed: Sep. 25, 2020

(86) PCT No.: PCT/CN2020/117753
§ 371 (c)(1),
(2) Date: Mar. 22, 2023

(87) PCT Pub. No.: WO2022/061717
PCT Pub. Date: Mar. 31, 2022

(65) Prior Publication Data
US 2023/0370235 A1      Nov. 16, 2023

(51) Int. Cl.
*H04L 5/00*          (2006.01)
*H04W 72/231*          (2023.01)
(52) U.S. Cl.
CPC ......... *H04L 5/0082* (2013.01); *H04W 72/231* (2023.01)

(58) Field of Classification Search
CPC ........................... H04W 72/231; H04L 5/0082
USPC .......................................................... 370/329
See application file for complete search history.

(56) References Cited

U.S. PATENT DOCUMENTS

2020/0037396 A1*    1/2020   Islam ................ H04W 52/0229

FOREIGN PATENT DOCUMENTS

CN          104010368  A       8/2014
CN          111193571  A       5/2020

OTHER PUBLICATIONS

European Patent Application No. 20954569.8, Search and Opinion dated Oct. 11, 2023, 8 pages.
Ericsson "Feature lead summary on timing relationship enhancements" 3GPP TSG-RAN WG1 Meeting #102e, R1-200xxxx, Aug. 2020, 64 pages.
Indian Patent Application No. 202347026600, Office Action dated Jan. 18, 2024, 6 pages.
PCT/CN2020/117753, English translation of Search Report dated Jun. 23, 2021, 3 pages.

* cited by examiner

*Primary Examiner* — Peter G Solinsky
(74) *Attorney, Agent, or Firm* — Cozen O'Connor

(57) ABSTRACT
A method for determining an effective time includes: UE determining a time with a preset time interval from a downlink slot at which the UE receives a MAC CE signaling as an effective time of a configuration carried in the MAC CE signaling, wherein the preset time interval comprises at least a compensation duration for the UE to switch to the configuration carried in the MAC CE signaling.

19 Claims, 4 Drawing Sheets

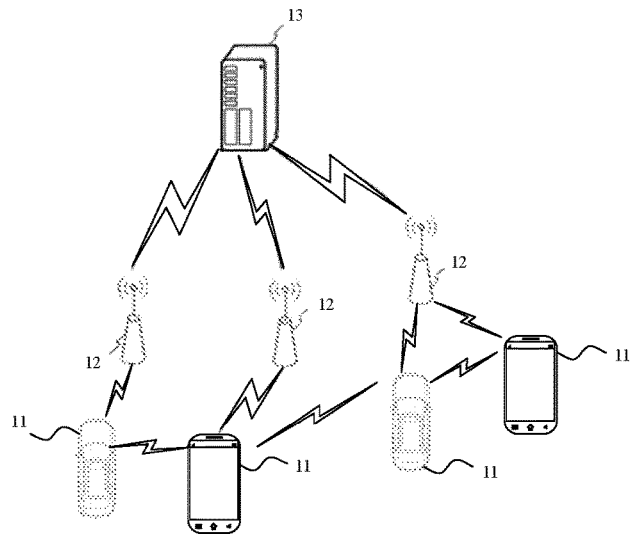

FIG. 1

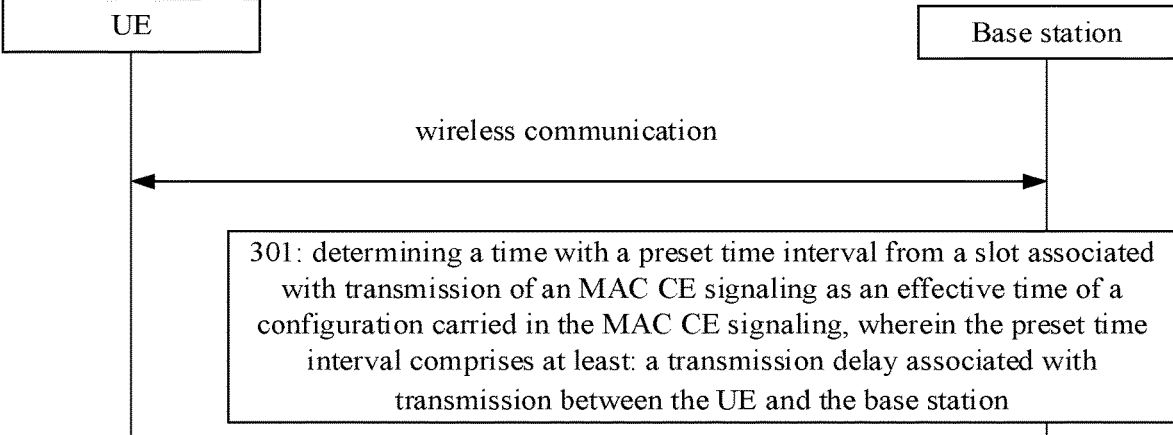

FIG. 2

| UE | | Base station |
|---|---|---| wireless communication

301: determining a time with a preset time interval from a slot associated with transmission of an MAC CE signaling as an effective time of a configuration carried in the MAC CE signaling, wherein the preset time interval comprises at least: a transmission delay associated with transmission between the UE and the base station

FIG. 3

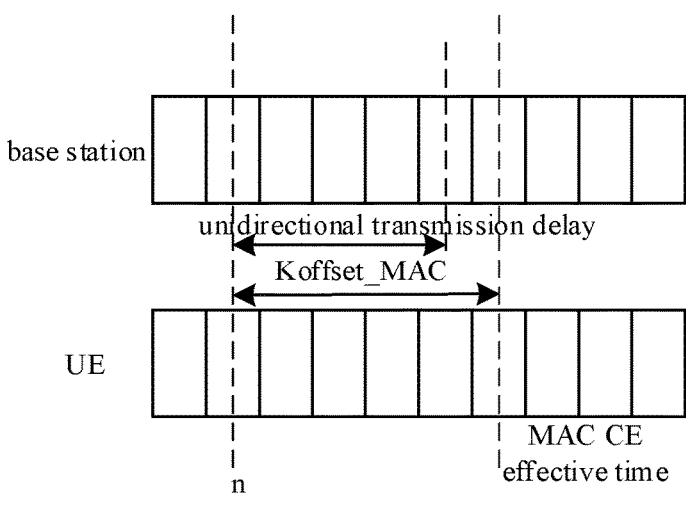

FIG. 4

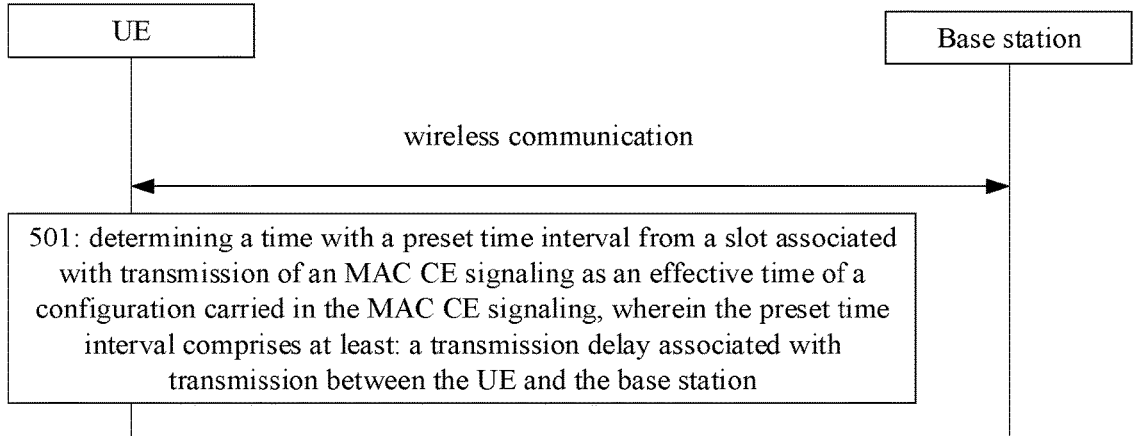

501: determining a time with a preset time interval from a slot associated with transmission of an MAC CE signaling as an effective time of a configuration carried in the MAC CE signaling, wherein the preset time interval comprises at least: a transmission delay associated with transmission between the UE and the base station

FIG. 5

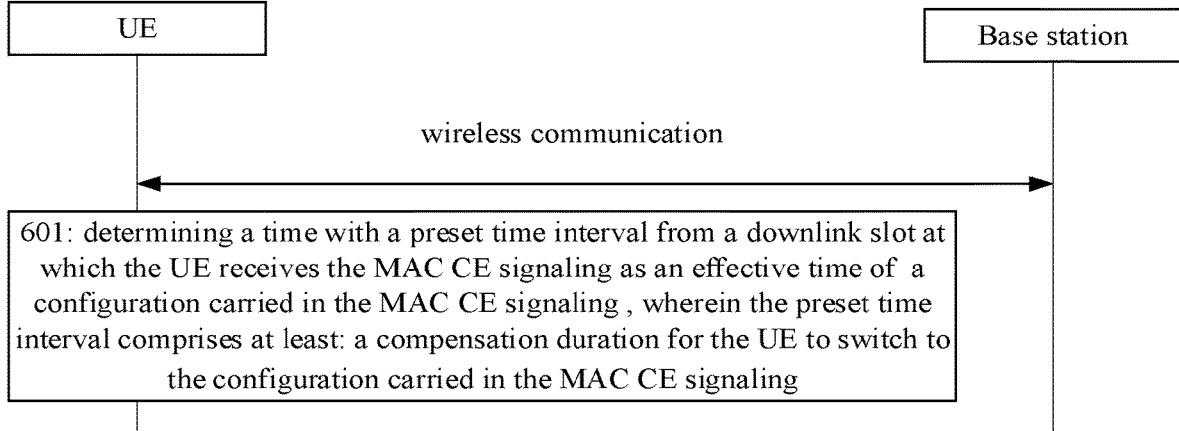

601: determining a time with a preset time interval from a downlink slot at which the UE receives the MAC CE signaling as an effective time of a configuration carried in the MAC CE signaling , wherein the preset time interval comprises at least: a compensation duration for the UE to switch to the configuration carried in the MAC CE signaling

FIG. 6

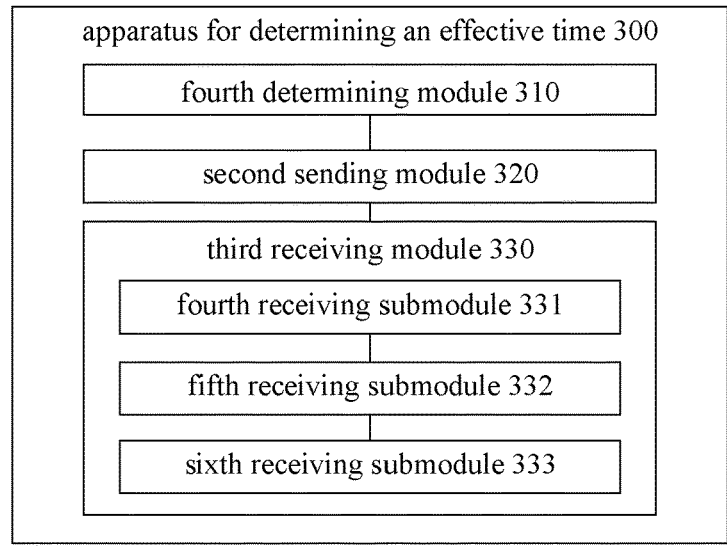

apparatus for determining an effective time 300 fourth determining module 310 second sending module 320 third receiving module 330 fourth receiving submodule 331 fifth receiving submodule 332 sixth receiving submodule 333

Memory

Processing
component

Processor

3020

Communication
component

3016

3006

Power
component

3008

Multimedia
component

Sensor
component

3014

3010

Audio
component

I/O interface

METHODS FOR DETERMINING EFFECTIVE TIME, AND COMMUNICATION DEVICE

CROSS-REFERENCE TO RELATED APPLICATION

This application is the U.S. national phase application of International Application No. PCT/CN2020/117753, filed on Sep. 25, 2020, the entire disclosure of which is incorporated herein by reference.

TECHNICAL FIELD

The disclosure relates to the field of wireless communication technology, but is not limited to the field of wireless communication technology.

BACKGROUND

In the research of scenarios such as Non-Terrestrial Networks (NTN) in cellular mobile communication technology, satellite communication is considered as an important aspect of the development of cellular mobile communication technology in the future.

SUMMARY

According to a first aspect of the disclosure, a method for determining an effective time is provided, which is applied to a base station. The method includes: determining a time with a preset time interval from a slot associated with transmission of a Media Access Control Control Element (MAC CE) signaling as an effective time of a configuration carried in the MAC CE signaling, in which the preset time interval includes at least: a transmission delay associated with transmission between a user equipment (UE) and the base station.

According to a second aspect of the disclosure, a method for determining an effective time is provided, which is applied to a UE. The method includes: determining a time with a preset time interval from a slot associated with transmission of a MAC CE signaling as an effective time of a configuration carried in the MAC CE signaling, in which the preset time interval includes at least: a transmission delay associated with transmission between the UE and a base station.

According to a third aspect of the embodiments of the disclosure, a method for determining an effective time is provided, which is applied to a UE. The method includes: determining a time with a preset time interval from a downlink slot at which the UE receives a MAC CE signaling as an effective time of a configuration carried in the MAC CE signaling, in which the preset time interval comprises at least: a compensation duration for the UE to switch to the configuration carried in the MAC CE signaling.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description.

FIG. 1 is a structural schematic diagram illustrating a wireless communication system according to an exemplary embodiment.

FIG. 2 is a schematic diagram illustrating an NTN scenario network mechanism according to an exemplary embodiment.

FIG. 3 is a flowchart illustrating a method for determining an effective time according to an exemplary embodiment.

FIG. 4 is a schematic diagram illustrating a MAC CE effective time sequence according to an exemplary embodiment.

FIG. 5 is a flowchart illustrating another method for determining an effective time according to an exemplary embodiment.

FIG. 6 is a flowchart illustrating yet another method for determining an effective time according to an exemplary embodiment.

FIG. 9 is a block diagram illustrating yet another apparatus for determining an effective time according to an exemplary embodiment.

FIG. 10 is a block diagram illustrating a device for determining an effective time according to an exemplary embodiment.

DETAILED DESCRIPTION

Figure 7:
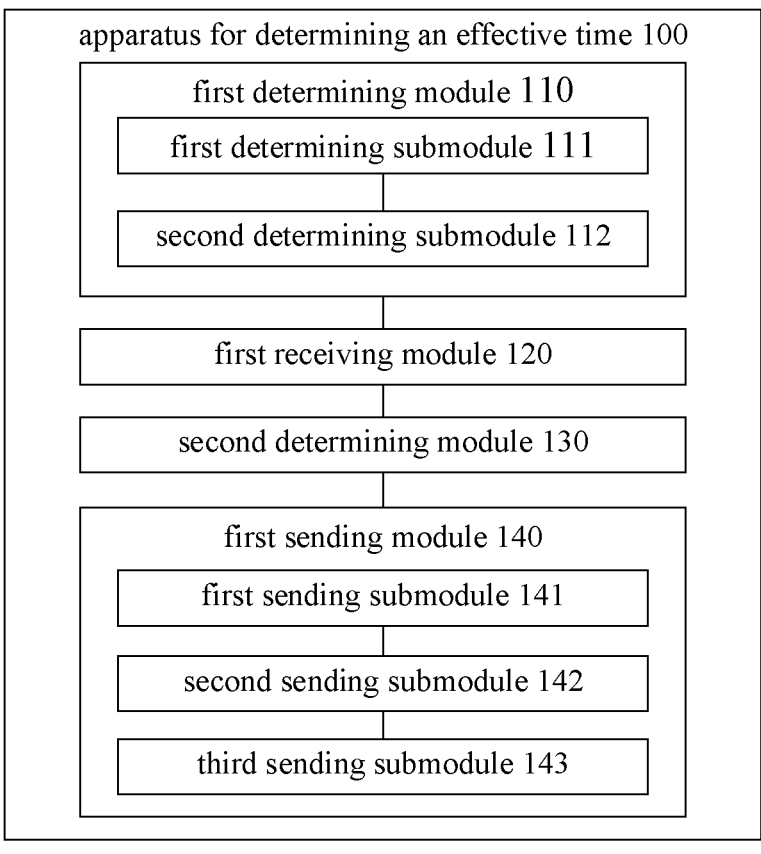
FIG. 7 is a block diagram illustrating an apparatus for determining an effective time according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the embodiments of the disclosure are only for the purpose of describing specific embodiments, and are not intended to limit the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in the embodiments of this disclosure to describe various information, the information should not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the term "if" as used herein can be interpreted as "when", "while" or "in response to determining".

The satellite communication refers to the communication between cellular mobile communication devices on the ground using satellites as relays. The satellite communication system consists of satellite parts and ground parts. The characteristics of satellite communication include that, the communication range is large; communication may be performed from any two points as long as they are within a coverage range of radio waves emitted by the satellite; and it is not vulnerable to terrestrial hazards.

According to the embodiments of the disclosure, the effective time of the configuration carried in the MAC CE signaling is determined based on the preset time interval including the transmission delay. On the one hand, the situation can be reduced where due to the transmission delay between the UE and the base station, the base station is unable to determine a condition for the UE of receiving the MAC CE signaling when the configuration is taken into effect and thus the configuration fails to be taken into effect. On the other hand, it may cause the base station and the UE to understand the effective time of the configuration carried in the MAC CE signaling in the same way, which improves the success rate of taking into effect the configuration carried in the MAC CE signaling.

FIG. 1 illustrates a schematic diagram of a wireless communication system according to an exemplary embodiment of the disclosure. As shown in FIG. 1, the wireless communication system is a communication system based on the cellular mobile communication technology, and the wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a mobile phone (or "cellular" phone) and a computer with the IoT terminal. For example, the terminal 11 may be a fixed, portable, pocket, hand-held, built-in computer or a vehicle-mounted device, such as, a Station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be an Unmanned Aerial Vehicle (UAV) device. Alternatively, the terminal 11 may also be a vehicle-mounted device, such as, an Engine Control Unit (ECU) with a wireless communication function, and a wireless communication device connected to the ECU. Alternatively, the terminal 11 may also be a roadside device, such as, a street light, a signal light, or other roadside devices with a wireless communication function.

The base station 12 may be a network-side device in the wireless communication system. The wireless communication system may be the 4th generation (4G) mobile communication system, also known as a Long Term Evolution (LTE) system. Alternatively, the wireless communication system may also be the 5th generation (5G) mobile communication system, also known as a New Radio (NR) system or 5G NR system. Alternatively, the wireless communication system may also be a next-generation system of the 5G system. The access network in the 5G system may be called New Generation-Radio Access Network (NG-RAN). Alternatively, the wireless communication system may also be a Machine Type Communication (MTC) system.

The base station 12 may be an evolved base station (evolved node B, eNB) in the 4G system. Alternatively, the base station 12 may also be a base station (next generation node B, gNB) that adopts a centralized distributed architecture in the 5G system. When the base station 12 adopts a centralized distributed architecture, it generally includes a Central Unit (CU) and at least two Distributed Units (DUs). The CU is provided with protocol stacks of a Packet Data Convergence Protocol (PDCP) layer, a Radio Link Control (RLC) layer, and a MAC layer. A physical (PHY) layer protocol stack is set in the DU, and the specific implementation of the base station 12 is not limited in this embodiment of the disclosure.

A wireless connection can be established between the base station 12 and the terminal 11 through a radio interface. In different implementations, the radio interface is a radio interface based on the 4G standard. Alternatively, the radio interface is a radio interface based on the 5G standard, such as, a NR. Alternatively, the radio interface may also be a radio interface based on a next generation of the 5G standard.

In some embodiments, an End to End (E2E) connection may also be established between the terminals 11, for example, scenes such as Vehicle to Vehicle (V2V) communication, Vehicle to Infrastructure (V2I) communication and Vehicle to Pedestrian (V2P) communication in a Vehicle to Everything (V2X) communication.

In some embodiments, the above wireless communication system may further include a network management device 13.

The plurality of the base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 13 is not limited in this embodiment of the disclosure.

The execution devices involved in the embodiment of the disclosure include, but are not limited to, UEs such as cell phone terminals supporting the cellular mobile communication, and the base stations.

An application scenario of this embodiment of the disclosure is the NTN scenario, as shown in FIG. 2, where the network architecture in the case of transparent forwarding on the satellite side is that the satellite establishes the communication channel with the terminal by connecting to the ground station, the core network, and the data network sequentially.

Since the transmission distance from the terminal to the base station in the NTN scenario is relatively long, the transmission delay may be relatively large, which brings uncertainty to the time sequence of the communication system, for example, to the effective time of the configuration carried in the MAC CE signaling.

In the related art, the base station can notify the UE of changes in the configuration information via the MAC CE, such as beam switch, a Transmission Configuration Indicator (TCI) status and other operations. For the MAC CE effective time, it is agreed that when the UE receives a Physical Downlink Shared Channel (PDSCH) for carrying the MAC CE signaling, and the UE sends an acknowledgement (ACK) for this PDSCH at slot n, the UE will make new configuration information notified in the MAC CE effective at $$\text{slot } n + 3N_{slot}^{subframe,\mu}$$

The $$N_{slot}^{subframe,\mu}$$

is a number of slots contained in a subframe when a Sub-Carrier Space (SCS) is configured as μ. The slot at which the UE sends the ACK can be scheduled by the base station. In the NTN scenario, there is a large transmission delay for the communication between the UE and the base station. The transmission delay may include: a transmission delay between the UE and the satellite, and/or a transmission delay between the satellite and the satellite ground station, and/or a transmission delay between the satellite ground station and the base station, and/or a forwarding delay of the satellite, and/or a forwarding delay of the satellite ground station. Due to the high mobility of the satellite, the transmission delay may change. If the effective time of the related art is adopted, the base station may not receive the ACK at the effective time, and failure of taking the configuration into effect may occur.

FIG. 3 is a flowchart of a method for determining an effective time according to an exemplary embodiment. The method for determining an effective time can be applied to a base station in the cellular mobile communication system, and the method includes the following steps.

At step 301, a time with a preset time interval from a slot associated with transmission of a MAC CE signaling is determined as an effective time of a configuration carried in the MAC CE signaling, in which the preset time interval includes at least: a transmission delay associated with transmission between a UE and the base station.

The UE may be a cell phone terminal that uses the cellular mobile communication technology for wireless communication. The base station can be a communication device that provides an access network interface for the UE in the cellular mobile communication system.

As shown in FIG. 2, in the NTN scenario, the UE can achieve data communication with the base station by forwarding of the satellite and the satellite ground station.

In the NTN scenario, there is a large transmission delay for the communication between the UE and the base station. The transmission delay may include: the transmission delay between the UE and the satellite, and/or the transmission delay between the satellite and the satellite ground station, and/or the transmission delay between the satellite ground station and the base station, and/or the forwarding delay of the satellite, and/or the forwarding delay of the satellite ground station. Due to the high mobility of the satellite, the transmission delay may change.

The slot associated with the transmission of the MAC CE signaling may be used as a reference time, and the time with an interval from the slot is determined as the effective time of the configuration carried in the MAC CE signaling, in which the interval includes at least the transmission delay associated with the transmission between the UE and the base station.

The slot associated with the transmission of the MAC CE signaling may be a slot directly or indirectly associated with the transmission of the MAC CE signaling. For example, the slot associated with the transmission of the MAC CE signaling may include: a slot at which the base station sends the MAC CE signaling, a slot at which the UE receives the MAC CE signaling, and a slot at which the UE sends the ACK in response to the MAC CE signaling.

The preset time interval may be used to adjust the effective time of the configuration carried in the MAC CE signaling to be behind the time when the base station has confirmed that the UE is ready for the configuration to take effect. For example, the preset time interval may be used to adjust the effective time of the configuration carried in the MAC CE signaling to be behind the time when the base station receives the ACK sent by the UE based on the MAC CE signaling.

The transmission delay may be determined by the base station and/or the UE based on the current actual transmission delay, or by a communication protocol. The preset time interval may include only the transmission delay, and the preset time interval may also include the time interval specified in the related art:

$$3N_{slot}^{subframe,\mu}.$$

In an example, the UE sends the ACK at slot n. The UE takes into effect the configuration carried in the MAC CE signaling at a time that adds the slot of the transmission delay to $$\text{slot } n + 3N_{slot}^{subframe,\mu}$$

In this way, the effective time of the configuration carried in the MAC CE signaling is determined based on the preset time interval including the transmission delay. On the one hand, the situation can be reduced where due to the transmission delay between the UE and the base station, the base station is unable to determine a condition for the UE of receiving the MAC CE signaling when the configuration is taken into effect and thus the configuration fails to be taken in effect. On the other hand, it may cause the base station and the UE to understand the effective time of the configuration carried in the MAC CE signaling in the same way, which improves the success rate of taking into effect the configuration carried in the MAC CE signaling.

In an embodiment, the transmission delay associated with the transmission between the UE and the base station includes at least one of:

a unidirectional transmission delay between the UE and the base station;

a maximum unidirectional transmission delay between the UE and the base station within a cell where the UE is located; or a maximum unidirectional transmission delay between the UE and the base station within a beam where the UE is located.

The transmission delay associated with the transmission between the UE and the base station may be the unidirectional transmission delay of the transmission between the UE and the base station. In the related art, the delay generated when the UE sends the ACK for the PDSCH carrying the MAC CE is a unidirectional transmission delay between the UE and the base station, and the preset time interval may include the unidirectional transmission delay between the UE and the base station, so that the base station may determine that the UE has received the configuration carried in the MAC CE signaling at the effective time, which improves the success rate of taking into effect the configuration carried in the MAC CE signaling.

When the UE is within a satellite signal coverage range, the satellite moves relative to the UE, which in turn causes changes of the unidirectional transmission delay between the UE and the base station. The preset time interval may include a maximum value of the unidirectional transmission delay between the UE and the base station. The preset time interval may include the maximum unidirectional transmission delay between the UE and the base station within the cell in which the UE is located. The preset time interval may also include the maximum unidirectional transmission delay between the UE and the base station within the beam in which the UE is located. The beam may be a beam used by the satellite for carrying the wireless signal and may include one or more beams obtained by beamforming. In this way, the influence of the effective time due to the relative movement between the satellite and the UE may be reduced, and the success rate of taking into effect the configuration carried in the MAC CE signaling is improved.

In an embodiment, determining the time with the preset time interval from the slot associated with the transmission of the MAC CE signaling as the effective time of the configuration carried in the MAC CE signaling, includes:

determining a time with the preset time interval from an uplink slot at which the UE sends an ACK in response to the MAC CE signaling, as the effective time of the configuration carried in the MAC CE signaling.

The uplink slot at which the UE sends the ACK in response to the MAC CE signaling can be used as the reference time, and a time with the preset time interval from the uplink slot is determined as the effective time of the configuration carried in the MAC CE signaling, which is applied to the NTN scenarios where there is a long delay between the UE and the base station.

For example, as shown in FIG. 4, when the UE sends ACK information at the uplink slot n in response to the PDSCH carrying the MAC CE, the effective time of the configuration carried in the MAC CE signaling may be {uplink slot n+the downlink slot corresponding to Koffset_MAC}. The Koffset_MAC represents the preset time interval, which may include: the transmission delay. The koffset_MAC may also include $$3N_{slot}^{subframe,\mu}$$

in the related art.

In this way, the situation can be reduced where due to the transmission delay between the UE and the base station, the base station is unable to determine a condition for the UE of receiving the MAC CE signaling when the configuration is taken into effect and thus the configuration fails to be taken in effect.

In an embodiment, the preset time interval further includes:

a duration in which the base station switches to the configuration carried in the MAC CE signaling.

After the base station receives the ACK information, it needs to switch to the configuration carried in the MAC CE signaling. The preset time interval may include the duration in which the base station switches to the configuration carried in the MAC CE signaling, thus improving the accuracy of compensation and improving the success rate of taking into effect the configuration carried in the MAC CE signaling.

In an example, when the UE sends the ACK information at the uplink slot n for the PDSCH carrying the MAC CE, the effective time of the configuration carried in the MAC CE signaling may be the {uplink slot n+the downlink slot corresponding to Koffset_MAC}. The Koffset_MAC represents the preset time interval, and the Koffset MAC includes: a sum of the transmission delay plus the duration in which the base station switches to the configuration carried in the MAC CE signaling.

In an embodiment, determining the time with the preset time interval from the slot associated with the transmission of the MAC CE signaling as the effective time of the configuration carried in the MAC CE signaling, includes:

determining a time with the preset time interval from a downlink slot at which the base station sends the MAC CE signaling, as the effective time of the configuration carried in the MAC CE signaling.

The base station and the UE may determine the effective time of the configuration carried in the MAC CE signaling based on a different reference time.

In response to a feedback that the UE does not perform Hybrid Automatic Repeat reQuest (HARQ) of the MAC CE signaling, i.e., the UE does not send the ACK information for the MAC CE signaling, the downlink slot at which the base station sends the MAC CE signaling may be determined as a starting time for the calculation of the effective time of the configuration carried in the MAC CE signaling. The base station may determine a moment when the determined MAC CE signaling is transmitted to the UE as the effective time on the base station side.

In an example, on the base station side, the base station sends the MAC CE signaling at slot m, and then the base station uses the configuration carried in the MAC CE signaling at {slot m+X2}, in which X2 is the preset time interval.

In an embodiment, the preset time interval further includes:

a compensation duration in which the UE switches to the configuration carried in the MAC CE signaling.

After the UE receives the configuration carried in the MAC CE signaling, it needs to switch to the configuration carried in the MAC CE signaling. The preset time interval may include the compensation duration used to compensate the duration in which the UE switches to the configuration carried in the MAC CE signaling, so as to improve the accuracy of the effective time of the configuration carried in the MAC CE signaling and improve the success rate of taking into effect the configuration carried in the MAC CE signaling.

The UE may switch to the configuration carried in the MAC CE signaling after receiving the configuration carried in MAC CE signaling and may start the configuration. The UE may determine the downlink slot at which the base station sends the MAC CE signaling plus the compensation duration in which the UE switches to the configuration carried in the MAC CE signaling, as the effective time.

In an example, when the terminal receives the PDSCH carrying the MAC CE at slot n, the terminal applies the new configuration at {slot n+X1}. The X1 includes at least the compensation duration, which may be determined based on the UE capability.

In an embodiment, the method further includes:

receiving duration indication information sent by the UE indicating a duration for the UE to switch to the configuration carried in the MAC CE signaling; and determining the compensation duration based on the duration indication information.

The duration indication information is used to indicate the actual duration for the UE to switch to the configuration. The UE may send the duration indication information to the base station, and then the base station determines the compensation duration. The compensation duration may be greater than or equal to the duration for the UE to switch to the configuration carried in the MAC CE signaling.

In an embodiment, the method further includes:

sending time interval indication information indicating the preset time interval to the UE.

The time interval indication information is sent by the base station to the UE, so that the base station and the UE use the same preset time interval, thus improving the success rate of taking into effect the configuration carried in the MAC CE signaling. The preset time interval may be specified by the communication protocol. The base station can send the time interval indication information to the UE via the satellite.

In an embodiment, sending the time interval indication information indicating the preset time interval to the UE includes at least one of:

broadcasting system information carrying the time interval indication information to the UE;

sending a high-level signaling carrying the time interval indication information to the UE; or sending a physical layer signaling carrying the time interval indication information to the UE.

The time interval indication information may be carried in the system information, and/or the high-level signaling, and/or the physical layer signaling, and may be sent to the UE.

The base station may carry the time interval indication information in the existing system information, and/or the existing high-level signaling, and/or the existing physical layer signaling. For example, reserved bits in the existing system information, and/or the existing high-level signaling, and/or the existing physical layer signaling are used to carry the time interval indication information, thus improving the utilization efficiency of the existing system information, and/or the high-level signaling, and/or the physical layer signaling.

The base station may also carry the time interval indication information in a dedicated system information, and/or a dedicated high-level signaling, and/or a dedicated physical layer signaling.

FIG. 5 is a flowchart of another method for determining an effective time according to an exemplary embodiment. The method can be applied to the UE in the cellular mobile communication system. The method includes the following steps.

At step 501, a time with a preset time interval from a slot associated with transmission of a MAC CE signaling is determined as an effective time of a configuration carried in the MAC CE signaling, in which the preset time interval includes at least: a transmission delay associated with transmission between the UE and a base station.

The UE may be a cell phone terminal that uses the cellular mobile communication technology for wireless communication. The base station can be a communication device that provides an access network interface to the UE in the cellular mobile communication system.

As shown in FIG. 2, in the NTN scenario, the UE can achieve data communication with the base station by forwarding of the satellite and the satellite ground station.

In the NTN scenario, there is a large transmission delay in the communication between UE and the base station. The transmission delay may include: a transmission delay between the UE and the satellite, and/or a transmission delay between the satellite and the satellite ground station, and/or a transmission delay between the satellite ground station and the base station, and/or a forwarding delay of the satellite, and/or a forwarding delay of the satellite ground station. Due to the high mobility of the satellite, the transmission delay may change.

The slot associated with the transmission of the MAC CE signaling may be used as a reference time, and the time with an interval from the slot is determined as the effective time of the configuration carried in the MAC CE signaling, in which the interval includes at least the transmission delay associated with the transmission between the UE and the base station.

The slot associated with the transmission of the MAC CE signaling may be a slot directly or indirectly associated with the transmission of the MAC CE signaling. For example, the slot associated with the transmission of the MAC CE signaling may include: a slot at which the base station sends the MAC CE signaling, a slot at which the UE receives the MAC CE signaling, and a slot at which the UE sends the ACK feedback in response to the MAC CE signaling.

The preset time interval may be used to adjust the effective time of the configuration carried in the MAC CE signaling to be behind the time when the base station has confirmed that the UE is ready for the configuration to take effect. For example, the preset time interval may be used to adjust the effective time of the configuration carried in the MAC CE signaling to be behind the time when the base station receives the ACK sent by the UE based on the MAC CE signaling.

The transmission delay may be determined by the base station and/or the UE based on the current actual transmission delay, or by a communication protocol. The preset time interval may include only the transmission delay, and the preset time interval may also include the time interval specified in the related art:

$$3N_{slot}^{subframe,\mu}.$$

In an example, the UE sends the ACK at slot n. The UE takes into effect the configuration carried in the MAC CE signaling at a time that adds the slot of the transmission delay to $$\text{slot } n + 3N_{slot}^{subframe,\mu}$$

In this way, the effective time of the configuration carried in the MAC CE signaling is determined based on the preset time interval including the transmission delay. On the one hand, the situation can be reduced where due to the transmission delay between the UE and the base station, the base station is unable to determine a condition for the UE of receiving the MAC CE signaling when the configuration is taken into effect and thus the configuration fails to be taken in effect. On the other hand, it may cause the base station and the UE to understand the effective time of the configuration carried in the MAC CE signaling in the same way, which improves the success rate of taking into effect the configuration carried in the MAC CE signaling.

In an embodiment, the transmission delay associated with the transmission between the UE and the base station includes at least one of:

a unidirectional transmission delay between the UE and
the base station;

a maximum unidirectional transmission delay between
the UE and the base station within a cell where the UE
is located; or a maximum unidirectional transmission delay between
the UE and the base station within a beam where the
UE is located.

The transmission delay associated with the transmission
between the UE and the base station may be the unidirec-
tional transmission delay of the transmission between the
UE and the base station. In the related art, the delay
generated when the UE sends the ACK for the PDSCH
carrying the MAC CE is a unidirectional transmission delay
between the UE and the base station, and the preset time
interval may include the unidirectional transmission delay
between the UE and the base station, so that the base station
may determine that the UE has received the configuration
carried in the MAC CE signaling at the effective time, which
improves the success rate of taking into effect the configu-
ration carried in the MAC CE signaling.

When the UE is within a satellite signal coverage range,
the satellite moves relative to the UE, which in turn causes
changes of the unidirectional transmission delay between the
UE and the base station. The preset time interval may
include a maximum value of the unidirectional transmission
delay between the UE and the base station. The preset time
interval may include the maximum unidirectional transmis-
sion delay between the UE and the base station within the
cell in which the UE is located. The preset time interval may
also include the maximum unidirectional transmission delay
between the UE and the base station within the beam in
which the UE is located. The beam may be a beam used by
the satellite for carrying the wireless signal and may include
one or more beams obtained by beamforming. In this way,
the influence of the effective time due to the relative move-
ment between the satellite and the UE may be reduced, and
the success rate of taking into effect the configuration carried
in the MAC CE signaling is improved.

In an embodiment, determining the time with the preset
time interval from the slot associated with the transmission
of the MAC CE signaling as the effective time of the
configuration carried in the MAC CE signaling, includes:

determining a time with the preset time interval from an
uplink slot at which the UE sends an ACK in response
to the MAC CE signaling, as the effective time of the
configuration carried in the MAC CE signaling.

The uplink slot at which the UE sends the ACK in
response to the MAC CE signaling can be used as the
reference time, and a time with the preset time interval from
the uplink slot is determined as the effective time of the
configuration carried in the MAC CE signaling, which is
applied to the NTN scenarios where there is a long delay
between the UE and the base station in long delay.

For example, as shown in FIG. 4, when the UE sends
ACK information at the uplink slot n in response to the
PDSCH carrying the MAC CE, the effective time of the
configuration carried in the MAC CE signaling may be
{uplink slot n+the downlink slot corresponding to
Koffset_MAC}. The Koffset_MAC represents the preset
time interval, which may include: transmission delay. The
koffset_MAC may also include $$3N_{slot}^{subframe,\mu}$$

in the related all.

12

In this way, the situation can be reduced where due to the
transmission delay between the UE and the base station, the
base station is unable to determine a condition for the UE of
receiving the MAC CE signaling when the configuration is
taken into effect and thus the configuration fails to be taken
in effect.

In an embodiment, the preset time interval further
includes:

a duration in which the base station switches to the
configuration carried in the MAC CE signaling.

After the base station receives the ACK information, it
needs to switch to the configuration carried in the MAC CE
signaling. The preset time interval may include the duration
in which the base station switches to the configuration
carried in the MAC CE signaling, thus improving the
accuracy of compensation and improving the success rate of
taking into effect the configuration carried in the MAC CE
signaling.

In an example, when the UE sends the ACK information
at the uplink slot n for the PDSCH carrying the MAC CE,
the effective time of the configuration carried in the MAC
CE signaling may be the {uplink slot n+the downlink slot
corresponding to Koffset MAC}. The Koffset_MAC repre-
sents the preset time interval, and the Koffset MAC includes:
a sum of the transmission delay plus the duration in which
the base station switches to the configuration carried in the
MAC CE signaling.

In an embodiment, the method further includes:

receiving time interval indication information indicating
the preset time interval sent by the base station.

The time interval indication information is sent by the
base station to the UE, so that the base station and the UE
use the same preset time interval, thus improving the success
rate of taking into effect the configuration carried in the
MAC CE signaling. The preset time interval may be speci-
fied by the communication protocol.

In an embodiment, receiving the time interval indication
information indicating the preset time interval sent by the
base station includes at least one of:

receiving system information carrying the time interval
indication information broadcasted by the base station;

receiving a high-level signaling carrying the time interval
indication information sent by the base station; or receiving a physical layer signaling carrying the time
interval indication information sent by the base station.

The time interval indication information may be carried in
the system information, and/or the high-level signaling,
and/or the physical layer signaling, and may be sent to the
UE.

The base station may carry the time interval indication
information in the existing system information, and/or the
existing high-level signaling, and/or the existing physical
layer signaling. For example, reserved bits in the existing
system information, and/or the existing high-level signaling,
and/or the existing physical layer signaling are used to carry
the time interval indication information, thus improving the
utilization efficiency of the existing system information,
and/or the existing high-level signaling, and/or the existing
physical layer signaling.

The base station may also carry the time interval indica-
tion information in a dedicated system information, and/or a
dedicated high-level signaling, and/or a dedicated physical
layer signaling.

FIG. 6 is a flowchart of yet another method for determin-
ing an effective time according to an exemplary embodiment. The method can be applied to the UE in the cellular mobile communication system. The method includes the following steps.

At step 601, a time with a preset time interval from a downlink slot at which the UE receives the MAC CE signaling is determined as an effective time of a configuration carried in the MAC CE signaling, in which the preset time interval includes at least: a compensation duration for the UE to switch to the configuration carried in the MAC CE signaling.

The UE may be a cell phone terminal that uses the cellular mobile communication technology for wireless communication. The base station may be a communication device that provides an access network interface to the UE in the cellular mobile communication system.

As shown in FIG. 2, in the NTN scenario, the UE can achieve data communication with the base station by forwarding of the satellite and the satellite ground station.

In the NTN scenario, there is a large transmission delay for the communication between the UE and the base station. The transmission delay may include: a transmission delay between the UE and the satellite, and/or a transmission delay between the satellite and the satellite ground station, and/or a transmission delay between the satellite ground station and the base station, and/or a forwarding delay of the satellite, and/or a forwarding delay of the satellite ground station. Due to the high mobility of the satellite, the transmission delay may change.

The slot associated with the transmission of the MAC CE signaling may be used as a reference time, and the time with an interval from the slot is determined as the effective time of the configuration carried in the MAC CE signaling, in which the interval includes at least the transmission delay associated with the transmission between the UE and the base station.

The slot associated with the transmission of the MAC CE signaling may be a slot directly or indirectly associated with the transmission of the MAC CE signaling. For example, the slot associated with the transmission of the MAC CE signaling may include: a slot at which the base station sends the MAC CE signaling, a slot at which the UE receives the MAC CE signaling, and a slot at which the UE sends the ACK in response to the MAC CE signaling.

The preset time interval may be used to adjust the effective time of the configuration carried in the MAC CE signaling to be behind the time when the base station has confirmed that the UE is ready for the configuration to take effect. For example, the preset time interval may be used to adjust the effective time of the configuration carried in the MAC CE signaling to be behind the time when the base station receives the ACK sent by the UE based on the MAC CE signaling.

The transmission delay may be determined by the base station and/or the UE based on the current actual transmission delay, or by a communication protocol. The preset time interval may include only the transmission delay, and the preset time interval may also include the time interval specified in the related art:

$$3N_{slot}^{subframe,\mu}.$$

For example, the UE sends the ACK at slot n. The UE takes into effect the configuration carried in the MAC CE signaling at a time that adds the slot of the transmission delay to $$slot\ n + 3N_{slot}^{subframe,\mu}$$

In this way, the effective time of the configuration carried in the MAC CE signaling is determined based on the preset time interval including the transmission delay. On the one hand, the situation can be reduced where due to the transmission delay between the UE and the base station, the base station is unable to determine a condition for the UE of receiving the MAC CE signaling when the configuration is taken into effect and thus the configuration fails to be taken in effect. On the other hand, it may cause the base station and the UE to understand the effective time of the configuration carried in the MAC CE signaling in the same way, which improves the success rate of taking into effect the configuration carried in the MAC CE signaling.

The base station and the UE may determine the effective time of the configuration carried in the MAC CE signaling based on a different reference time.

In response to a feedback that the UE does not perform HARQ of the MAC CE signaling, i.e., the UE does not send the ACK information for the MAC CE signaling, the downlink slot at which the base station sends the MAC CE signaling may be determined as a starting time for the calculation of the effective time of the configuration carried in the MAC CE signaling. The base station may determine a moment when the determined MAC CE signaling is transmitted to the UE as the effective time on the base station side.

In an example, on the base station side, the base station sends the MAC CE signaling at slot m, and then the base station uses the configuration carried in the MAC CE signaling at {slot m+X2}, in which X2 is the preset time interval.

In an embodiment, the method further includes:

sending duration indication information sent by the UE indicating a duration for the UE to switch to the configuration carried in the MAC CE signaling, in which the duration indication information is configured for a base station to determine the compensation duration.

After the UE receives the configuration carried in the MAC CE signaling, it needs to switch to the configuration carried in the MAC CE signaling. The preset time interval may include a compensation duration used to compensate a duration in which the UE switches to the configuration carried in the MAC CE signaling, so as to improve the accuracy of the effective time of the configuration carried in the MAC CE signaling and improve the success rate of taking into effect the configuration carried in the MAC CE signaling.

The UE may switch to the configuration carried in the MAC CE signaling after receiving the configuration carried in MAC CE signaling and may start the configuration. The UE may determine the downlink slot at which the base station sends the MAC CE signaling plus the compensation duration in which the UE switches to the configuration carried in the MAC CE signaling, as the effective time.

In an example, when the terminal receives the PDSCH carrying the MAC CE at slot n, the terminal applies the new configuration at {slot n+X1}. The X1 includes at least the compensation duration, which may be determined based on the UE capability.

The duration indication information is used to indicate the actual duration for the UE to switch to the configuration. The UE may send the duration indication information to the base station, and then the base station determines the compensation duration. The compensation duration may be greater than or equal to the duration for the UE to switch to the configuration carried in the MAC CE signaling.

In an embodiment, the method further includes:

receiving time interval indication information indicating the preset time interval sent by the base station.

The time interval indication information is sent by the base station to the UE, so that the base station and the UE use the same preset time interval, thus improving the success rate of taking into effect the configuration carried in the MAC CE signaling. The preset time interval may be specified by the communication protocol.

In an embodiment, receiving the time interval indication information indicating the preset time interval sent by the base station includes at least one of:

receiving system information carrying the time interval indication information broadcasted by the base station;

receiving a high-level signaling carrying the time interval indication information sent by the base station; or receiving a physical layer signaling carrying the time interval indication information sent by the base station.

The time interval indication information may be carried in the system information, and/or the high-level signaling, and/or the physical layer signaling, and may be sent to the UE.

The base station may carry the time interval indication information in the existing system information, and/or the existing high-level signaling, and/or the existing physical layer signaling. For example, reserved bits in the existing system information, and/or the existing high-level signaling, and/or the existing physical layer signaling are used to carry the time interval indication information, to improve the utilization efficiency of the existing system information, and/or the existing high-level signaling, and/or the existing physical layer signaling.

The base station may also carry the time interval indication information in a dedicated system information, and/or a dedicated high-level signaling, and/or a dedicated physical layer signaling.

A specific example is provided below in combination with any of the above embodiments.

Method 1

The preset time interval applied for the MAC CE to take effect is defined, i.e., a Koffset_MAC parameter. The Koffset_MAC is used to compensate the transmission delay in the satellite communication scenario. The value of the Koffset_MAC parameter needs to cover a unidirectional transmission delay from the terminal to the base station side. The base station informs the terminal of the parameter value by the system information, the high-level signaling, or the physical layer signaling.

In an implementation, the value of the Koffset_MAC parameter includes a current unidirectional transmission delay from the terminal to the base station side. As shown in FIG. 4, when the terminal sends ACK information at the uplink slot n for the PDSCH carrying the MAC CE, the effective time of the MAC CE is a sum of the uplink slot n and a downlink slot corresponding to the Koffset_MAC. The value of the Koffset MAC includes the unidirectional transmission delay. Optionally, the value of the Koffset_MAC parameter includes the unidirectional transmission delay, and the time for the base station to switch to downlink configuration.

Method 2

For MAC CE transmission, the terminal does not need a feedback of performing HARQ. When the terminal receives the PDSCH carrying the MAC CE at slot n, the terminal applies the new configuration at {slot n+X1}. The X1 depends on the capabilities of the terminal, such as the time for the terminal to switch to the configuration carried in the MAC CE.

On the base station side, the base station sends the MAC CE signaling at slot m, and then the base station may use the new configuration carried in the MAC CE signaling at {slot m+X2} to serve for the user. The value of X2 may be specified in a protocol and notified to the terminal by the base station through the high-level signaling or the physical layer signaling.

In another implementation, the value of the Koffset_MAC parameter includes a maximum unidirectional transmission delay from the terminal to the base station side in a current satellite service cell or in a service beam where the terminal is located. Based on the same principle, when the terminal sends the ACK information at the uplink slot n for the PDSCH carrying the MAC CE, the effective time of the MAC CE is the sum of uplink slot n and the downlink slot corresponding to the Koffset_MAC. The value of the Koffset MAC includes the maximum unidirectional transmission delay in the current satellite service cell or in the service beam where the terminal is located. Optionally, the value of the Koffset MAC includes the maximum unidirectional transmission delay in the current satellite service cell or in the service beam where the terminal is located, and the time when the base station switches to the downlink configuration.

The embodiments of the disclosure also provide an apparatus for determining an effective time, applied to a base station for wireless communication. As shown in FIG. 7, the apparatus 100 includes: a first determining module 110.

The first determining module 110 is configured to determine a time with a preset time interval from a slot associated with transmission of a Media Access Control Control Element (MAC CE) signaling as an effective time of a configuration carried in the MAC CE signaling, in which the preset time interval includes at least: a transmission delay associated with transmission between a UE and the base station.

In an embodiment, the transmission delay associated with the transmission between the UE and the base station includes at least one of:

a unidirectional transmission delay between the UE and the base station;

a maximum unidirectional transmission delay between the UE and the base station within a cell where the UE is located; or a maximum unidirectional transmission delay between the UE and the base station within a beam where the UE is located.

In an embodiment, the first determining module 110 includes: a first determining submodule 111.

The first determining submodule 111 is configured to determine a time with the preset time interval from an uplink slot at which the UE sends an acknowledgement in response to the MAC CE signaling, as the effective time of the configuration carried in the MAC CE signaling.

In an embodiment, the preset time interval further includes:

a duration in which the base station switches to the configuration carried in the MAC CE signaling.

In an embodiment, the first determining module 110 includes: a second determining submodule 112.

The second determining submodule 112 is configured to determine a time with the preset time interval from a downlink slot at which the base station sends the MAC CE signaling, as the effective time of the configuration carried in the MAC CE signaling.

In an embodiment, the preset time interval further includes:

a compensation duration in which the UE switches to the configuration carried in the MAC CE signaling.

In an embodiment, the apparatus 100 further includes: a first receiving module 120 and a second determining module 130.

The first receiving module 120 is configured to receive duration indication information sent by the UE indicating a duration for the UE to switch to the configuration carried in the MAC CE signaling.

The second determining module 130 is configured to determine the compensation duration based on the duration indication information.

In an embodiment, the apparatus 100 further includes: a first sending module 140.

The first sending module 140 is configured to send time interval indication information indicating the preset time interval to the UE.

In an embodiment, the first sending module 140 includes at least one of: a first sending submodule 141, a second sending submodule 142, or a third sending submodule 143.

The first sending submodule 141 is configured to broadcast system information carrying the time interval indication information to the UE.

The second sending submodule 142 is configured to send a high-level signaling carrying the time interval indication information to the UE.

The third sending submodule 143 is configured to send a physical layer signaling carrying the time interval indication information to the UE.

Figure 8:
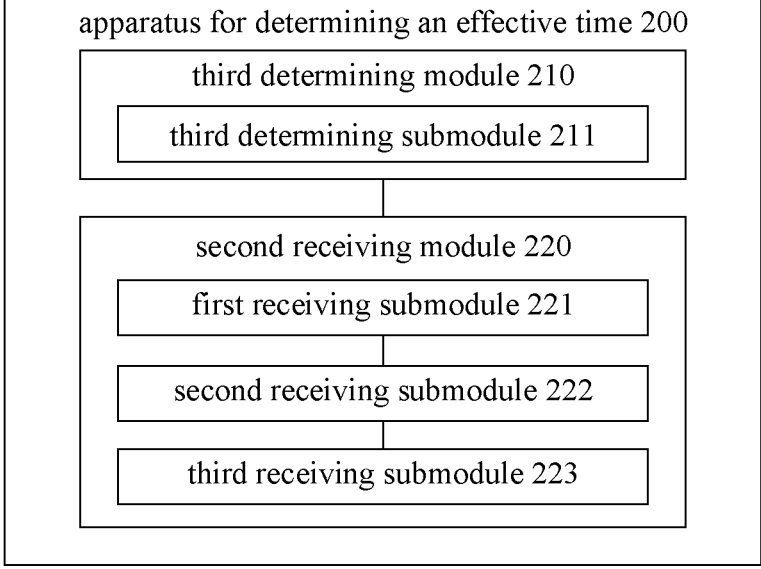
FIG. 8 is a block diagram illustrating another apparatus for determining an effective time according to an exemplary embodiment.

The embodiments of the disclosure also provide an apparatus for determining an effective time, applied to a UE of wireless communication. As shown in FIG. 8, the apparatus 200 includes: a third determining module 210.

The third determining module 210 is configured to determine a time with a preset time interval from a slot associated with transmission of a MAC CE signaling as an effective time of a configuration carried in the MAC CE signaling, in which the preset time interval includes at least: a transmission delay associated with transmission between the UE and a base station.

In an embodiment, the transmission delay associated with transmission between the UE and the base station includes at least one of:

a unidirectional transmission delay between the UE and the base station;

a maximum unidirectional transmission delay between the UE and the base station within a cell where the UE is located; or a maximum unidirectional transmission delay between the UE and the base station within a beam where the UE is located.

In an embodiment, the third determining module 210 includes: a third determining submodule 211.

The third determining submodule 211 is configured to determine a time with the preset time interval from an uplink slot at which the UE sends an acknowledgement in response to the MAC CE signaling, as the effective time of the configuration carried in the MAC CE signaling.

In an embodiment, the preset time interval further includes:

a duration in which the base station switches to the configuration carried in the MAC CE signaling.

In an embodiment, the apparatus 200 further includes: a second receiving module 220.

The second receiving module 220 is configured to receive time interval indication information indicating the preset time interval sent by the base station.

In an embodiment, the second receiving module 220 includes at least one of: a first receiving submodule 221, a second receiving submodule 222, or a third receiving submodule 223.

The first receiving submodule 221 is configured to receive system information carrying the time interval indication information broadcasted by the base station.

The second receiving submodule 222 is configured to receive a high-level signaling carrying the time interval indication information sent by the base station.

The third receiving submodule 223 is configured to receive a physical layer signaling carrying the time interval indication information sent by the base station.

The embodiments of the disclosure also provide an apparatus for determining an effective time, applied to a UE of wireless communication. As shown in FIG. 9, the apparatus 300 includes: a fourth determining module 310.

The fourth determining module 310 is configured to determine a time with a preset time interval from a downlink slot at which the UE receives the MAC CE signaling as an effective time of a configuration carried in the MAC CE signaling, in which the preset time interval includes at least: a compensation duration for the UE to switch to the configuration carried in the MAC CE signaling.

In an embodiment, the apparatus 300 further includes: a second sending module 320.

The second sending module 320 is configured to send duration indication information sent by the UE indicating a duration for the UE to switch to the configuration carried in the MAC CE signaling, in which the duration indication information is configured for a base station to determine the compensation duration.

In an embodiment, the apparatus 300 further includes: a third receiving module 330.

The third receiving module 330 is configured to receive time interval indication information indicating the preset time interval sent by the base station.

In an embodiment, the third receiving module 330 includes at least one of: a fourth receiving submodule 331, a fifth receiving submodule 332, or a sixth receiving submodule 333.

The fourth receiving submodule 331 is configured to receive system information carrying the time interval indication information broadcasted by the base station.

The fifth receiving submodule 332 is configured to receive a high-level signaling carrying the time interval indication information sent by the base station.

The sixth receiving submodule 333 is configured to receive a physical layer signaling carrying the time interval indication information sent by the base station.

In the exemplary embodiment, the first determining module 110, the first receiving module 120, the second determining module 130, the first sending module 140, the third determining module 210, the second receiving module 220, the fourth determining module 310, the second sending module 320, and the third receiving module 330 can be implemented by one or more Central Processing units (CPUs), Graphics Processing Units (GPUs), Baseband Processors (BPs), Application Specific Integrated Circuits (ASICs), DSPs, Programmable Logic Devices (PLDs), Complex Programmable Logic Devices (CPLDs), Field-Programmable Gate Array (FPGAs), general processors, controllers, Micro Controller Units (MCUs), microprocessors or other electronic components, and can be used to implement the above method.

FIG. 10 is a block diagram of a device 3000 for determining an effective time according to an exemplary embodiment. For example, the device 3000 may be a mobile phone, a computer, a digital broadcasting terminal, a message transceiver device, a game console, a tablet device, a medical device, a fitness device and a personal digital assistant.

As illustrated in FIG. 10, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to perform all or part of the steps in the above described method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or their combination, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, and the peripheral interface modules may be a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, 3G, 4G, or 5G, or their combination. In an exemplary embodiment, the communication component 3016 receives a broadcast signal or broadcast associated information from an external broadcast management system via a broadcast channel. In an exemplary embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including instructions, such as the memory 3004, that are executable by the processor 3020 in the device 3000, for performing the above method. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This disclosure is intended to cover any variations, uses, or adaptations of the disclosure that follow the general principles of the embodiments of the disclosure and include common knowledge or conventional technical means in the art not described in the above embodiments of the disclosure. It is intended that the specification and examples be considered as exemplary only, with a true scope of the disclosure being indicated by the following claims.

It will be appreciated that the disclosure is not limited to the exact construction that has been described above and illustrated in the accompanying drawings, and that various modifications and changes can be made without departing from the scope of the disclosure. It is intended that the scope of the disclosure only be limited by the appended claims.

What is claimed is:

1. A method for determining an effective time, performed by a base station, comprising:
   determining a time with a preset time interval from a slot associated with transmission of a media access control control element (MAC CE) signaling as an effective time of a configuration carried in the MAC CE signaling, wherein the preset time interval comprises at least: a transmission delay associated with transmission between a user equipment (UE) and the base station;
   wherein determining the time with the preset time interval from the slot associated with transmission of the MAC CE signaling as the effective time of the configuration carried in the MAC CE signaling, comprises:
   in response to determining that the UE does not send an acknowledgement in response to receiving the MAC CE signaling, determining a time with the preset time interval from a downlink slot at which the base station sends the MAC CE signaling, as the effective time of the configuration carried in the MAC CE signaling.

2. The method of claim 1, wherein the transmission delay associated with the transmission between the UE and the base station comprises at least one of:
   a unidirectional transmission delay between the UE and the base station;
   a maximum unidirectional transmission delay between the UE and the base station within a cell where the UE is located; or
   a maximum unidirectional transmission delay between the UE and the base station within a beam where the UE is located.

3. The method of claim 1, wherein determining the time with the preset time interval from the slot associated with transmission of the MAC CE signaling as the effective time of the configuration carried in the MAC CE signaling, comprises:
   determining a time with the preset time interval from an uplink slot at which the UE sends an acknowledgement in response to receiving the MAC CE signaling, as the effective time of the configuration carried in the MAC CE signaling.

4. The method of claim 3, wherein the preset time interval further comprises:
   a duration in which the base station switches to the configuration carried in the MAC CE signaling.

5. The method of claim 1, wherein the preset time interval further comprises:
   a compensation duration in which the UE switches to the configuration carried in the MAC CE signaling.

6. The method of claim 5, further comprising:
   receiving duration indication information sent by the UE indicating a duration for the UE to switch to the configuration carried in the MAC CE signaling; and
   determining the compensation duration based on the duration indication information.

7. The method of claim 1, further comprising:
   sending time interval indication information indicating the preset time interval to the UE.

8. The method of claim 7, wherein sending the time interval indication information indicating the preset time interval to the UE comprises at least one of:
   broadcasting system information carrying the time interval indication information to the UE;
   sending a high-level signaling carrying the time interval indication information to the UE; or
   sending a physical layer signaling carrying the time interval indication information to the UE.

9. A method for determining an effective time, performed by a user equipment (UE), comprising:
   determining a time with a preset time interval from a slot associated with transmission of a media access control control element (MAC CE) signaling as an effective time of a configuration carried in the MAC CE signaling, wherein the preset time interval comprises at least: a transmission delay associated with transmission between the UE and a base station;
   wherein determining the time with the preset time interval from the slot associated with transmission of the MAC CE signaling as the effective time of the configuration carried in the MAC CE signaling, comprises:
   in response to determining not to send an acknowledgement for an MAC CE signaling, determining the time with the preset time interval from a downlink slot at which the UE receives the MAC CE signaling as the effective time of the configuration carried in the MAC CE signaling.

10. The method of claim 9, wherein the transmission delay associated with transmission between the UE and the base station comprises at least one of:
   a unidirectional transmission delay between the UE and the base station;
   a maximum unidirectional transmission delay between the UE and the base station within a cell where the UE is located; or
   a maximum unidirectional transmission delay between the UE and the base station within a beam where the UE is located.

11. The method of claim 9, wherein determining the time with the preset time interval from the slot associated with transmission of the MAC CE signaling as the effective time of the configuration carried in the MAC CE signaling, comprises:
   determining a time with the preset time interval from an uplink slot at which the UE sends an acknowledgement in response to receiving the MAC CE signaling, as the effective time of the configuration carried in the MAC CE signaling.

12. The method of claim 11, wherein the preset time interval further comprises:
   a duration in which the base station switches to the configuration carried in the MAC CE signaling.

13. The method of claim 9, further comprising:
   receiving time interval indication information indicating the preset time interval sent by the base station.

14. The method of claim 13, wherein receiving the time interval indication information indicating the preset time interval sent by the base station comprises at least one of:

receiving system information carrying the time interval indication information broadcasted by the base station;

receiving a high-level signaling carrying the time interval indication information sent by the base station; or receiving a physical layer signaling carrying the time interval indication information sent by the base station.

15. A method for determining an effective time, performed by a user equipment (UE), comprising:

in response to determining not to send an acknowledgement for a media access control control element (MAC CE) signaling, determining a time with a preset time interval from a downlink slot at which the UE receives the MAC CE signaling as an effective time of a configuration carried in the MAC CE signaling, wherein the preset time interval comprises at least: a compensation duration for the UE to switch to the configuration carried in the MAC CE signaling.

16. The method of claim 15, further comprising:

sending duration indication information sent by the UE indicating a duration for the UE to switch to the configuration carried in the MAC CE signaling, wherein the duration indication information is configured for a base station to determine the compensation duration.

17. The method of claim 15, further comprising:

receiving time interval indication information indicating the preset time interval sent by a base station.

18. The method of claim 17, wherein receiving the time interval indication information indicating the preset time interval sent by the base station comprises at least one of:

receiving system information carrying the time interval indication information broadcasted by the base station;

receiving a high-level signaling carrying the time interval indication information sent by the base station; or receiving a physical layer signaling carrying the time interval indication information sent by the base station.

19. A communication device comprising a processor, and a memory stored with programs executable by the processor, wherein when the programs are executed by the processor, the method for determining an effective time according to claim 9 is implemented.

* * * * *